United States Patent [19]
Weber

[11] Patent Number: 5,947,586
[45] Date of Patent: Sep. 7, 1999

[54] LAMP WITH A THREE-DIMENSIONAL INJECTION-MOLDED CIRCUIT CARRIER, IN PARTICULAR MOTOR VEHICLE INTERIOR LAMP

[75] Inventor: Adam Weber, Bietigheim-Bissingen, Germany

[73] Assignee: ITT Automotive Europe GmbH, Japan

[21] Appl. No.: 08/737,054

[22] PCT Filed: Apr. 27, 1995

[86] PCT No.: PCT/EP95/01603

§ 371 Date: Feb. 3, 1997

§ 102(e) Date: Feb. 3, 1997

[87] PCT Pub. No.: WO95/30559

PCT Pub. Date: Nov. 16, 1995

[30] Foreign Application Priority Data

May 5, 1994 [DE] Germany ............................ 44 15 885

[51] Int. Cl.[6] .................................................. F21V 7/04
[52] U.S. Cl. .................... 362/217; 362/226; 362/516; 362/343
[58] Field of Search ..................... 362/217, 307, 362/226, 296, 341, 343, 310, 516; 439/239, 931

[56] References Cited

U.S. PATENT DOCUMENTS 5,027,262  6/1991  Freed .................................... 362/249

FOREIGN PATENT DOCUMENTS

| | | |
|---|---|---|
| 0550708A1 | 7/1993 | European Pat. Off. . |
| A2108708 | 5/1972 | France . |
| GM7442109 | 5/1975 | Germany . |
| 2540002A1 | 3/1977 | Germany . |
| 2441330B2 | 3/1978 | Germany . |
| 2923712A1 | 12/1980 | Germany . |
| 3015693A1 | 11/1981 | Germany . |
| 3212962A1 | 10/1983 | Germany . |
| A3212962 | 10/1983 | Germany ............................ 362/226 |
| 3338279A1 | 5/1985 | Germany . |
| 342382C2 | 10/1987 | Germany . |
| 3729622C1 | 1/1989 | Germany . |
| 3904987A1 | 8/1990 | Germany . |
| 3931356A1 | 3/1991 | Germany . |
| 4038902A1 | 8/1991 | Germany . |
| WO8911740 | 11/1989 | WIPO . |

OTHER PUBLICATIONS

Official English Translation of the International Preliminary Examination Report for International Application No. PCA/EP95/01603 No date.

PCT Search Report Application No. PCT/EP95/1603 No date.

German Search Report Application No. P4415885.8 No date.

*Primary Examiner*—Thomas M. Sember
*Attorney, Agent, or Firm*—J. Gordon Lewis; Thomas N. Twomey

[57] ABSTRACT

A motor vehicle lamp employs conductor moldings in which conductor tracks extending in three dimensions can be created in the housing. In addition, the conductor moldings enable the integration of lamp connections, switches and lamp mount, as well as reflectors and cooling surfaces directly into the housing and separately inlaid or molded-in plates for contact tracks.

9 Claims, 3 Drawing Sheets

LAMP WITH A THREE-DIMENSIONAL INJECTION-MOLDED CIRCUIT CARRIER, IN PARTICULAR MOTOR VEHICLE INTERIOR LAMP

FIELD OF THE INVENTION

The invention pertains to a lamp with a three-dimensional (3D) injection-molded circuit carrier.

BACKGROUND OF THE INVENTION

The existing lamps, in particular interior lamps for motor vehicles, feature a large number of individual parts. These include base plate, circuit board, contact plug, contact bushing, housing covers, reflector and switch, which are integrated very little within each other. Therefore the lamps must have a complicated assembly from a larger number of individual parts.

The research alliance for three-dimensional electronic assemblies 3-D MID e.V., in Erlangen, has published a paper in which it is proposed to use three-dimensional structures, such as plastic housings, simultaneously for direct holding and reinforcement of conductor tracks and electronic components. In this case a method has become known for casting of injection molded conductor moldings in the housing. These conductor moldings, which are cast in a "two-shot" injection molding technology with the plastic housing, have the property that their surface (in a method comparable to the production of printed circuit boards) can be provided with conductor tracks. The plastics industry has described metallizable plastics in this regard, which can, for instance, be cast over with an additional, readily flowing, plastic such that surfaces of the metallizable conductor molding remain on the surface of the entire cast part which can later be metallized and can be used as conductor tracks or contact surfaces.

Therefore the purpose of the invention is to specify a lamp in which the explained technology can be used and which can be produced in large quantities at low cost by the integration of the components stated above, and that can be easily assembled.

SUMMARY OF THE INVENTION

In its most basic form, the invention includes a casting in the housing of a lamp, a suitably shaped conductor molding, in which the brackets needed for mounting the glow lamp are cast on the housing element. Since the brackets are formed by the conductor molding which has a metallizable surface, the glow lamp can be supplied with current, even though no additional metallic conductors lead to them, but rather only a conductor track applied to the conductor molding (similar to printed circuit boards).

The invention can also utilize the metallizability of the plastic surface simultaneously as a reflector for the glow lamp. Thus, at least a portion of the conductor molding is formed as a reflector and is cast in a single unit with the lamp housing. Thereafter, the reflector section is metallized with a metal which is suitable for reflection of light beams. In this case, we can use chromium, silver or aluminum, for instance. But other substances are also suitable, provided they have sufficient reflectivity. The stated solution also remains within the framework of the invention, when the conductor molding is formed from a plastic that has a bright color suitable for reflection, such as, white.

The metallized sections are particularly useful when used to simultaneously perform several tasks. For example, the metallized sections can be used simultaneously as conductor track to conduct the current to the glow lamp and as a reflector. An additional and supplemental possibility consists in using the large metal surface simultaneously for cooling purposes.

In a combination of features, in which the sections serve simultaneously as conductor tracks, in a refinement of the invention, it is recommended to use the combination of features in which a metallized section is allocated to each of the two contact ends of a preferably elongated glow lamp and supply the needed current to the associated contacts along said section. The same result is obtained when the sections are used for infeed of current to the two brackets in contact with the lamp contacts.

In a further refinement of the invention, the sections employed as reflectors are combined with the property of the brackets clamping the glow lamp. Accordingly, the brackets are formed from the reflector sections so that lamp housing, reflector, conductor tracks and the clamping brackets form an integrated unit.

As a replacement for or in addition to the assemblies described above, one additional contact or several contacts of a switch can be integrated into the housing of the lamp, with the moving contact being guided by means of an appropriate configuration of the housing itself. But it is also possible to mold the moving contact directly in a housing as a spring-like protrusion or contact arm, so that only one actuator has to be moved, whose movement brings the spring-mounted moving contact into contact with the fixed-position contact. In this manner it is possible, in addition to the above elements, to integrate a switch into the housing, while at the same time, a protrusion on the contact arm can project outside the contour of the interior lamp as a manually operated actuator element.

By means of the conductor molding(s), the plug outlets can be integrated into the invented lamp by molding to the housing, metallizable (blade-like) protrusions or even metallizable openings which can be used as contact blades or contact bushings.

Finally, the components formed in the housing of the lamp can be connected via conductor tracks by means of the conductor molding, said conductor tracks are configured as metallizable connecting surfaces between the elements.

DETAILED DESCRIPTION OF A PREFERRED EMBODIMENT

Figure 1:
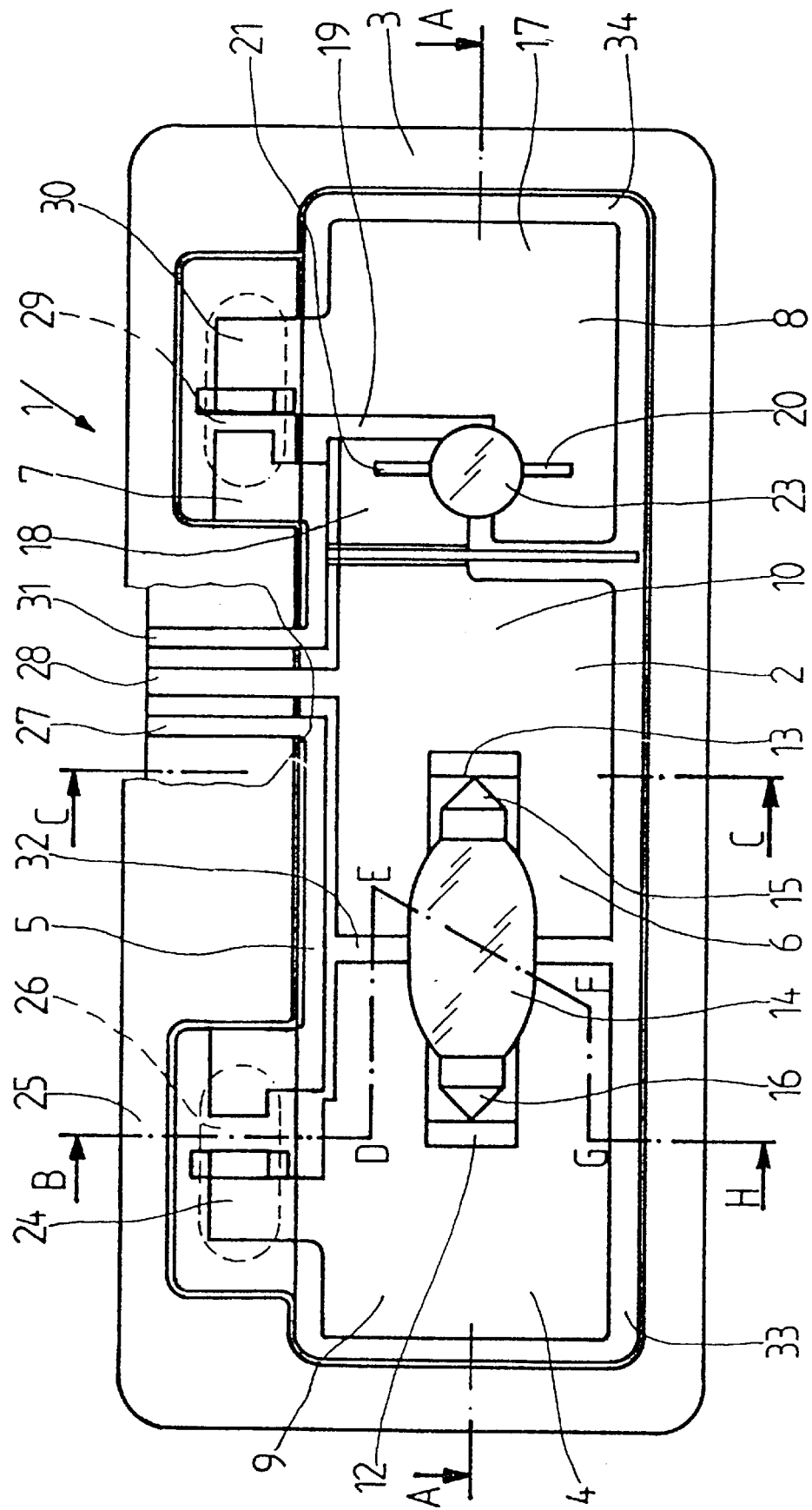
FIG. 1 is a top view of the interior lamp with the coverings removed.

FIG. 1 shows the housing 1 in which an injection-molded conductor molding is encased in part in a two-shot method by well flowing plastic material. Thus, the conductor molding whose surface can be metallized is cast first. Next, in a second injection molding step for the conductor molding, a flowable plastic coating is applied to all locations which are not to be metallized. The surfaces not covered by the flowable plastic coating thus form the future current-carrying surfaces, and individual regions can certainly be electrically isolated, so that several electrically separated conductor tracks are produced. In this case, the contour of the conductor tracks is specified by the contour of the metallizable regions of the conductor molding. Since during the galvanizing [sic; electroplating] process, given a suitable structure of the galvanizing bath, the deposited metal parts will be distributed uniformly onto the metallizable surfaces, in this manner, highly complicated, three-dimensional conductor track structures are obtained. Thus it is left to the user to divide either a single conductor molding during the second injection process by means of corresponding ridges into suitable circuit-regions, or to connect several conductor moldings together in a second injection process. FIG. 1 shows the housing 1, in which an injection-molded conductor molding 2 is encased in part by an encasing element 3. The encasing element 3 is coated in a second injection step around the conductor molding 2 where its surface is not to be metallized. The encasing element 3 thus covers the conductor molding except for the areas to be kept free of metal deposits.

After a subsequent galvanic process, the housing has five electrically conductive areas which perform different tasks in the switch. For example, the regions 4 and 6 form primarily two sections 9 and 10 of an essentially tub-like reflector 11. The two sections 9 and 10 in this case are coated with a suitable metal, such as silver or chromium, which is electrically conducting and highly reflective.

Figure 2:
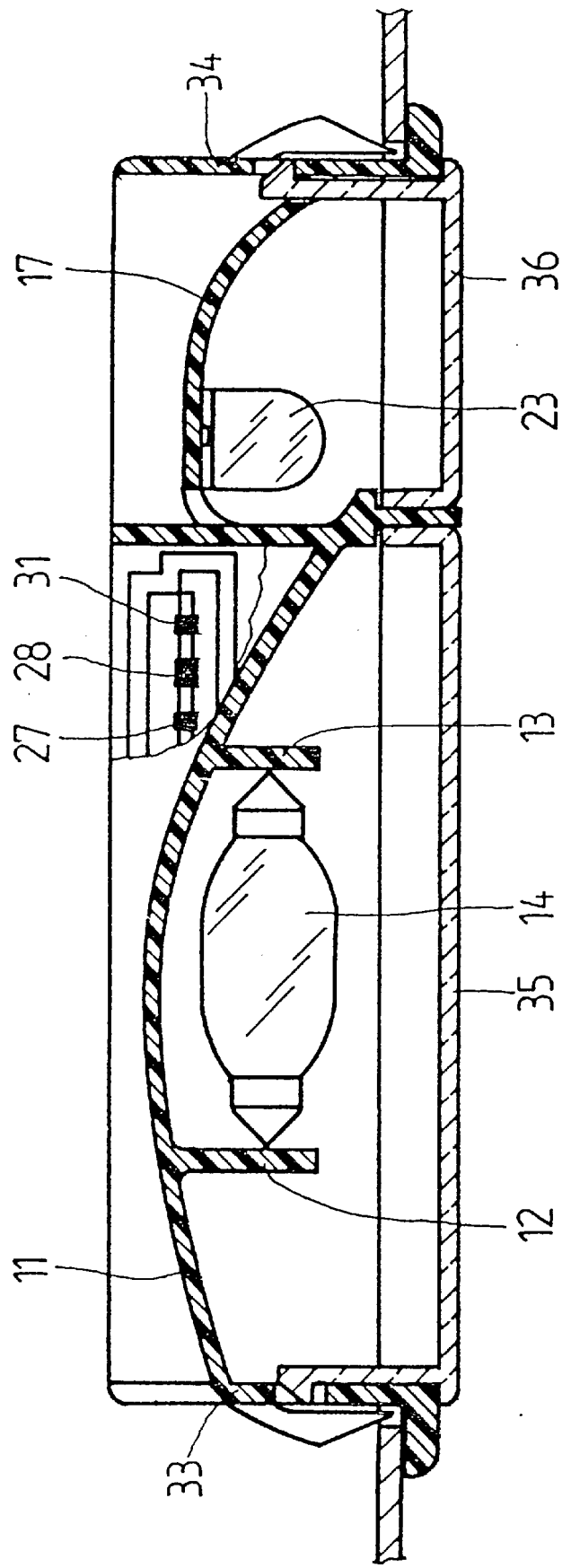
FIG. 2 is a cross section through the lamp according to FIG. 1 along line A—A.

As FIG. 1 and FIG. 2 show, clamp brackets 12, 13 are molded onto the sections 9 and 10; these brackets protrude from the tub 11 and can be bent elastically away from it. Like the surface of the tub, the surface of the brackets is coated with a conducting metal, and the tub and bracket are preferably made of the same metal. The contact ends 15, 16 of a glow lamp 14 are clamped between the brackets 12 and 13 and are thus electrically connected.

A second tub 17 performs the same task as the first tub 11, with the surface of the tub 11, 7 [sic] facing the viewer being composed of a conductive subsection 18 of the conductive section 10 and the conductive area 8. The subsection 18 and the conductive area 8 are separated electrically by an angled ridge 19 of the encasing element 3, on which no conductive metal can be deposited during the galvanic process. As a part of the conductive area 6, the subsection 18 is thus electrically separated from the conductive area 8. The conductor ends 20, 21 of a glow lamp 23 are electrically connected to the subsection 18 and the conductive area 8. If a voltage is applied to the area 8 with respect to the subsection 18, then the lamp 23 will light up.

The conductive area 4 features a subsection 24, which is designed as a flat part. The same goes for the conductive area 5. The subsection 24 and also a portion of the area 5 are surrounded by a switch wall 25 standing perpendicular to them wherein in the conductive area 5 and the conductive area 4 can be guided along the switch wall 25 by means of a corresponding structure of the encasing element 3.

Figure 3:
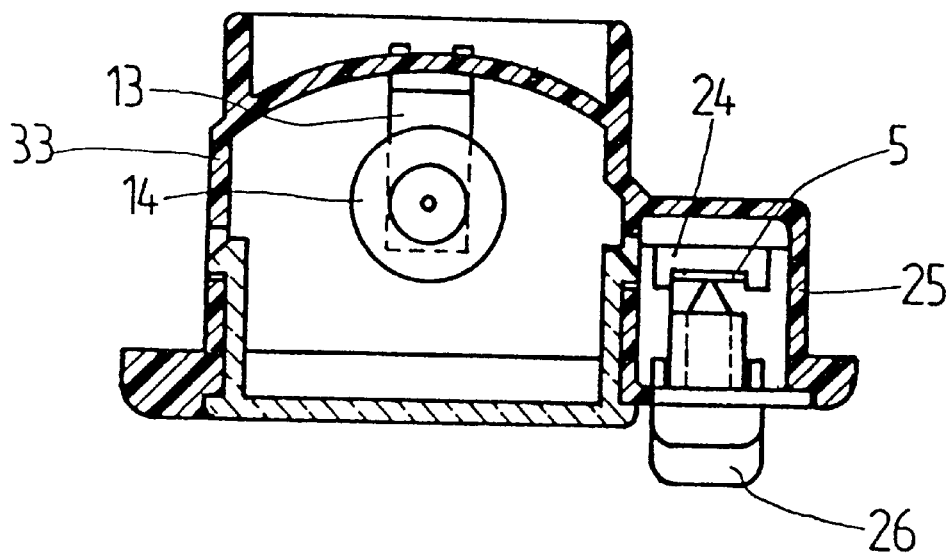
FIG. 3 is a cross section through the lamp according to FIG. 1 along the line B-D-E-F-G-H.
Figure 4:
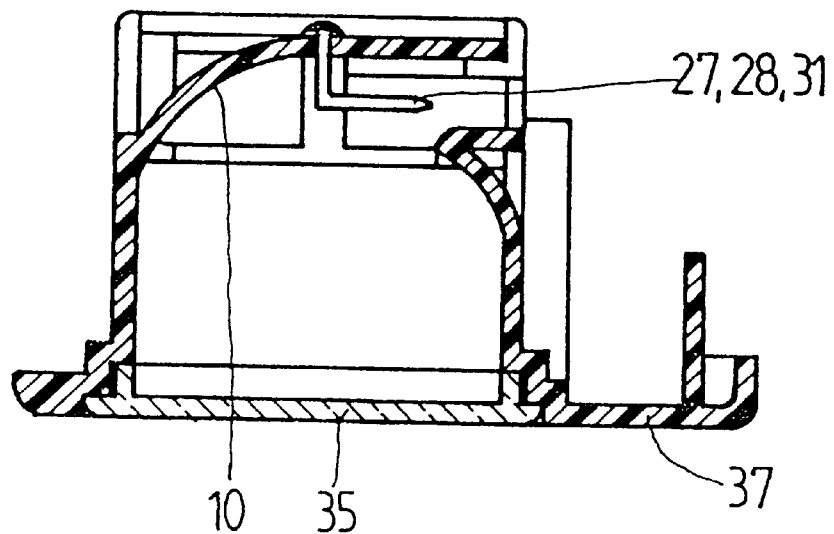
FIG. 4 is a cross section through the lamp according to FIG. 1 along the line C—C.

As indicated in FIG. 3, the switch wall 25 can be used simultaneously for mounting a moving switching element 26 (contact bridge), which electrically connects or disconnects the subsection 24 with the conductive area 5, depending on the particular setting. The conductive area 5 and the conductive area 6 run into plug contacts 27, 28. Thus if we apply a voltage to the plug contacts 27, 28, then the glow lamp 14 will light up, provided the moving switch element makes an electrical connection of the subsection 24 with the area 5. Thus we obtain, in an integrated format, an interior lamp in which the glow lamp 14 can be connected to current by means of plug contacts 27, 28 and a switch and also the brackets 12 and 13, with the current-carrying areas 4 and 6 serving in part also as reflector for the glow lamp.

The same also applies with regard to the subsection 18 and the conductive area 8. Here, too, a switch element 26 is shown by dashed lines and connects a subsection 30 of the area 8 to the conductive area 7, and, in turn, to a plug contact 31 associated with it.

The straight ridge 32 of the encasing element 3 performs the same electrical separating function as the angled bar 19.

In order to prevent back-cutting, the base of the housing 1 is open at the height of the first tub 11 and of the second tub 17, so that the nonreflective back sides of the two tubs are readily accessible from the side of the housing 1 turned away from the lamps 14, 23.

The housing 1 features an electrically nonconductive, first perimeter wall 33 and second perimeter wall 34, in which coverings 35, 36 can snap in. From the upper edge of the perimeter walls 33, 34 a perimeter aperture 37 branches off and is shown in cutaway view in FIG. 1, so that the blade contacts 27, 28 and 31 are visible.

The invention is based on the principle of shifting the conductor tracks in a lamp to the surface of the lamp housing, and in additional refinements, of utilizing the conductor tracks located at the surface simultaneously as reflectors, as cooling surface or plug contacts. For conductor tracks of this kind on the spatial surface of the lamp housing, the use of conductor moldings which are encased in the lamp housing was described above. But for the principle of the invention, the use of conductor moldings is not compulsory. Rather, the desired metallizing of the three-dimensional surface of the lamp housing required for the invention can also be achieved by an already known semiadditive method, without leaving the framework of the invention. In a semiadditive method of this kind the following steps take place: The surface of the housing is activated and the circuit areas coming into question are coated with electrolytic copper. Next, a photoresist is applied which is exposed with a spatial mask (3D mask). Next, the exposed area is developed with the photoresist. Subsequently, in an inherently known manner, electrolytic copper is applied and thinned by use of an etching mask and subsequently the photoresist is removed and the unneeded copper is etched away.

The conductor tracks obtained according to this known method consequently perform the same function as the conductor tracks obtained by means of the conductor molding. The conductor moldings are preferred in particular, when they are formed from a material which is able to perform additional tasks. For example, this can be the light guide in the interior of the housing of the lamp or of another component, or it can have a different coloration compared to the surrounding housing sections, or even a greater transparency than the surrounding housing. The use of the semiadditive method might be recommended in particular in a complex configuration of the conductor tracks.

I claim:

1. A motor vehicle interior lamp comprising:
    a lamp housing;
    a reflector disposed within the lamp housing;
    an injection molded conductor molding disposed in the lamp housing and having a pair of clamp brackets separated by a distance suitable for engaging contact ends of a glow lamp; and
    two conductive metallized areas electrically isolated from each other with each of the conductive metallized areas disposed over one of the clamp brackets, wherein the conductive metallized areas define the reflector.

2. A lamp as claimed in claim 1, wherein the conductive metallized areas are essentially symmetrical and are electrically isolated from each other.

3. A lamp as claimed in claim 1 wherein the conductor molding is cast integral with the lamp housing and two flat parts of the conductor molding are metallized and are freely accessible from an interior of the housing with the flat parts being adjacent and electrically isolated with a movable switching element disposed in the housing being selectiveably movable to electrically connect the two flat parts.

4. A lamp as claimed in claim 1, wherein plug contacts defining a plug for the lamp are fixed to the conductor molding and the conductive metallized areas extend to the plug contacts.

5. A lamp as claimed in claim 1, wherein a second glow lamp has two connector lines electrically connected to adjacent metallized areas.

6. A lamp as claimed in claim 1, wherein metallized electric conductors are cast into one of the lamp housing and the conductor molding and ends of the conductors are connected to one of the metallized layer and a load and a switch.

7. A motor vehicle interior lamp comprising:

a lamp housing;

a reflector disposed within the lamp housing;

an injection molded conductor molding disposed in the lamp housing and having a wide surface section curved in a concave fashion on a first side and being metallized on the first side to define the reflector; and a glow lamp disposed at least in part over the metallized first side.

8. A lamp as claimed in claim 7, wherein the reflector is conductive and the conductor molding includes a pair of metallized clamp brackets disposed on the first side and oriented to engage contact ends of the glow lamp.

9. A motor vehicle interior lamp comprising:

a lamp housing;

a conductor molding disposed within the lamp housing having a pair of opposing elastic metallized brackets projecting from the molding and electrically isolated from each other; and a glow lamp having contacts engaged by the brackets wherein a configuration of the metallized brackets is consistent with the use of a semiadditive method for metalizing the brackets; wherein the conductor molding forms a reflector for the glow lamp.

* * * * *